July 21, 1959
H. RUFF
2,896,059
MOUNTING HEAD ASSEMBLY FOR AN ELECTRICALLY
HEATED CUTTING TOOL
Filed Jan. 31, 1958
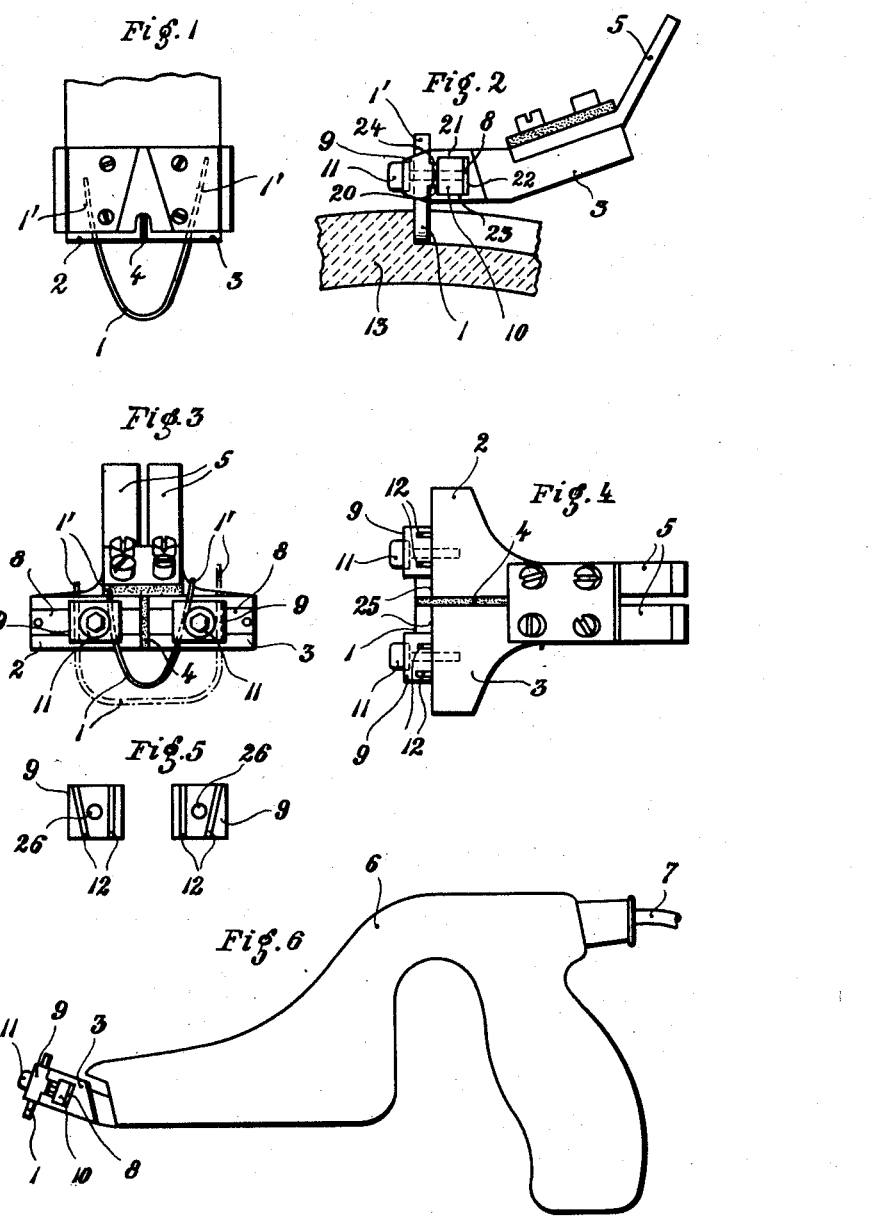
INVENTOR.
HERBERT RUFF
BY

2,896,059
MOUNTING HEAD ASSEMBLY FOR AN ELECTRICALLY HEATED CUTTING TOOL

Herbert Ruff, Grafing, near Munich, Germany

Application January 31, 1958, Serial No. 712,396

Claims priority, application Germany April 26, 1957

5 Claims. (Cl. 219—21)

The present invention relates to electrically heated cutting tools, and in particular to cutting tools which are suitable for cutting profiles in tire surfaces and which have adjustably and interchangeably mounted cutting blades.

In the prior art the heating of the cutting blades has been accomplished by two different methods. One method employed means to clamp the cutting band onto a supporting member made from heat conducting material and disposing said supporting member within an electric heating jacket. The other method of heating the cutting blade is to make use of high voltage secondary current from a transformer and to feed same through the cutting blade itself.

These prior methods of heating the cutting blades have various disadvantages. One of the main drawbacks is caused by contamination and interruption of the electrical contacts by rubber pieces and dust, which disadvantage is especially pronounced when a current is fed through the cutting blade itself. For example, a secondary voltage of approximately 1 volt might require a current intensity of as much as 60 amperes as a result of a contamination of the electrical contacts. In addition a contamination of the contacts results in highly undesirable fluctuations in the current flow.

A further disadvantage confronted by the prior art lies in inadequate means of adjusting the cutting blades. The cutting blades must conform exactly to the predetermined profiles of the tire. This necessitates an extremely precise adjustment of the blade shape. The necessary precision, however, is expensive and leads to complications and has not been achieved in the prior art.

It is one of the primary objects of the present invention to provide means affording assembly of electrically heated cutting means in such manner as to preclude the possibility of charring and contamination of electrical contacts of said cutting means.

It is a further object of the present invention to provide means conducive to simplified and efficient mounting of the cutting blades in a variety of shapes in such a manner that they are readily and conveniently adjustable and interchangeable so as to conform to the exact requirements of a plurality of predetermined profiles.

It is a further object of the present invention to provide means facilitating a simplified and efficient construction of the cutting blades on tire surface cutting apparatus.

A further object of the present invention is to provide means contributing to a highly efficient mounting structure for cutting blades or bands so that they are held firmly in predetermined position, whereby wobbling, twisting and turning of the cutting band is avoided despite various and relatively heavy stresses and strains to be imparted to the cutting blade during variegated cutting operations.

It is still another object of the present invention to provide means ensuring a highly simplified and efficient cutting apparatus of the aforesaid type which may be manipulated with great ease and facility even by unskilled labor.

It is a further object of the present invention to provide means rendering the possibility of constructing a cutting apparatus which can be efficaciously operated while affording unobstructed observation of the work performed by the cutting blades during cutting operations.

These and other objects of the invention will become further apparent from the following detailed description, reference being made to the accompanying drawing showing preferred embodiments of the invention.

In the drawing:

Fig. 1 shows a front elevation of a cutting blade with mounting head embodying the invention.

Fig. 2 is a side elevational view of the mounting head.

Fig. 3 is a front elevational view of the mounting head.

Fig. 4 is a top plan of the head of Fig. 3.

Fig. 5 shows detailed views of parts of the mounting head.

Fig. 6 is a side elevational view of the complete cutting apparatus pursuant to the invention.

Referring now to the drawing, and more particularly to Fig. 1, there is shown a cutting blade 1 which is shaped, as by bending, to conform to a predetermined profile size and is mounted between contact members 2 and 3 by means of the upwardly extending cutting blade arms 1'. Between the contact members 2 and 3 there is provided a suitable insulating member 4 which spaces or insulates said contact members from each other.

In Figs. 2 and 4 there is shown a mounting head assembly which is suitable for an upright mounting of the cutting blade 1. The mounting head consists of two contact members, 2 and 3, and two contact elements 5, each contact element being flexed upwards from its associated contact member at a convenient angle. The contact elements 5 define attachment means or prongs by means of which the mounting head assembly may be attached to a suitable holder, as for example, to a hand rip 6 as best seen in Fig. 6. A cable 7 leads directly from the hand grip to a suitable source of current via a transformer.

The contact members 2 and 3 increase in width when viewed from the contact elements 5 forwardly therefrom, as clearly seen in Fig. 4, so that the forwardmost face 25 of each of the contact members has the greatest width. The forward or frontal face of each of the contact members 2 and 3 is provided with a four-sided or rectangular recess 8 (see Fig. 2) bounded by walls 20, 21, 22 and 23, said recess extending over the entire width of the respective contact members.

These recesses or slots serve as guideways for the mounting means of the cutting blade 1 and will be described in greater detail hereinafter.

The aforementioned mounting means consists of two metal supporting blocks 9 and fastening blocks 10. The fastening blocks or abutments 10 slide in the recesses 8 and are securely disposed within said recesses in such a manner that they are prevented from falling out. Additionally, the forward face 25 of each of the contact members is provided with a slot or opening 24 which communicates with recess 8, said slot permitting insertion of suitable fastening means therethrough, as for example, screw 11 which extends into holes 26 formed in each of the metal blocks. Thus for each arm 1' of cutting blade 1 there is provided a metal block 9 and a fastening block or abutment 10.

The metal supporting blocks 9 are provided adjacent one face with one or more grooves 12 which are directed against the forward surface 25 of the contact members 2 and 3 and abut said forward surface when said metal blocks 9 are secured to their associated fastening block through the intermediary of screws 11. The grooves 12 run up and down, either perpendicularly or diagonally, through the metal blocks.

The free ends of arms 1' of the cutting blades 1 are disposed within these grooves and extend either perpendicularly or diagonally according to the respective direction of the groove. The metal blocks 9 are attached to the fastening blocks 10 by means of the screws 11 and can be spaced from each other at any desired position within the limits of the width of the forward face 25 of the contact members so as to retain the cutting blade in its desired flexed position. Each of the cutting blade arms 1' when disposed within groove 12 is firmly pressed against its adjacent contact member upon tightening of the screw 11. In this manner the cutting blade 1 is firmly mounted in an approximately perpendicular position and is protected against turning, twisting, and wobbling, thus contributing to greater accuracy and life of the cutting blade during the cutting operation.

It is of additional great importance that the blade be securely fixed in its mounting assembly, since during the cutting operation the blade is moved in all directions and is thereby subjected to many varied and intense stresses and strains. In Fig. 2 there is shown the cutting blade 1 during the cutting of an automobile tire 13.

Since the metal blocks 9 contain grooves 12 running in different directions, and can be turned as well as displaced, an adjustment can be made to conform to whatever cutting blade shape is necessary for the particular profile in question. In Fig. 3 there is shown in phantom lines another blade form having substantially a U-shape and supported in the vertically extending grooves.

Inasmuch as the mounting head can be attached to a hand grip 6 by means of the prong shaped contact elements 5, the cutting blade can be readily observed during the cutting operation and the manipulation of the apparatus can be greatly simplified.

It should thus be readily apparent that there is provided a mounting head assembly for an electrically heated cutting tool wherein an insulating member spaces a pair of contact members from each other, and the forward face of each contact member has a recess formed therein for slidably supporting a fastening block. Additionally, there is provided an adjustable metal block which supports the free ends of the cutting tool via suitable grooves which are formed in said metal blocks, the latter being detachably secured to the fastening blocks. The aforementioned assembly further is provided with contact elements which are adapted to engage a suitable holder and also are utilized to supply electric energy to the cutting tool for heating of the same.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A mounting head assembly for an electrically heated cutting tool, comprising a pair of contact members each terminating in an enlarged forward face, an insulating member disposed between said contact members, each of said contact members being provided with a recess adjacent said forward face, fastening block means slidably disposed within the respective recesses of said contact members, and supporting means for said cutting tool detachably secured to said fastening block means and contiguous with the forward face of said contact members, so that respective end portions of said cutting tool abut against said contact members to form a closed circuit for a supply of electrical energy utilized to heat said cutting tool, said supporting means being provided with respective grooves in which said end portions of said tool are received in mounted condition of said head assembly.

2. A mounting head assembly for supporting an elongated electrically heated cutting tool having two ends, comprising a pair of contact members each having an enlarged forward face, an insulating member disposed between said contact members, each of said contact members being provided with a horizontal recess located in each forward face, a fastening block slidably supported in each of said respective recesses of said contact members, metal block means provided with grooves for receiving and supporting said ends of said cutting tool and detachably secured to its associated fastening block, whereby said ends of said cutting tool are firmly pressed in contact with said contact members, said grooves being disposed in said metal block means at predetermined angles to each other.

3. A mounting head assembly for an electrically heatable cutting tool, comprising an insulating member, at least one pair of contact members spaced from each other said insulating member, each of said contact members being provided with a forward face and with a recess located in each forward face, a fastening block slidably supported in the respective recess, a metal block for supporting the respective end of said cutting tool and detachably secured to the respective fastening block, each metal block being provided with a plurality of groove means into which said respective ends of said cutting tool extend, and means for securing said metal block to said slidable fastening blocks, respectively, whereby upon displacement of said fastening blocks along said recesses and fixation of said metal blocks by said securing means, configuration and length of the effective portion of the cutting tool may be varied and set.

4. A mounting head assembly for an elongated electrically heated cutting tool utilized for cutting profiles in tire surfaces, said assembly being adapted to be mounted in a suitable holder; comprising and insulating member, a pair of contact members each provided with a forward face and symmetrically disposed between said insulating member, each of said contact members being provided adjacent its forward face with a recess, fastening block means slidably arranged within each recess of each contact member, a metal block for each end of the elongated cutting tool and provided with a plurality of groove means arranged angular to each other and for insertion of said cutting tool ends, respectively, said metal block abutting the forward face of its associated contact member and being detachably secured to said fastening block means, so that said ends of the cutting tool when disposed within said grooves nest against said contact members to define a circuit for movement of electrical energy from a source to said cutting tool for heating the latter, and means for displacing said metal blocks in the direction of said contact members and said fastening block means, whereby said ends of said cutting tool are forced into contact with said contact members.

5. An assembly for an electrically heatable, elongated tool having two ends; comprising a holder, an insulating member, a pair of contact members symmetrically disposed to each other and laterally of said insulating member, contact elements supported by said contact members and engageable with said holder, each of said contact members being provided with a horizontal recess adjacent the forward end of each contact member, fastening block means slidably arranged within each of said respective recesses of said contact members, a support block for each end of the tool and provided with groove means for insertion of the respective cutting tool ends, said support block abutting against the forward end of its associated contact member and being detachably secured to said slidable fastening block means, so that said ends of the tool when disposed within the respective grooves nest against said contact members to define a circuit for movement of electrical energy to said tool for heating the latter, and means for tightening said ends of said tool toward said contact elements.

References Cited in the file of this patent

UNITED STATES PATENTS

| | | |
|---|---|---|
| 2,101,913 | Meyer | Dec. 14, 1937 |
| 2,240,382 | Van Alstine | Apr. 29, 1941 |
| 2,258,027 | Mossback et al. | Oct. 7, 1941 |
| 2,620,428 | DeGreen | Dec. 2, 1952 |